(12) United States Patent
Rohleder et al.

(10) Patent No.: US 9,052,887 B2
(45) Date of Patent: Jun. 9, 2015

(54) FAULT TOLERANCE OF DATA PROCESSING STEPS OPERATING IN EITHER A PARALLEL OPERATION MODE OR A NON-SYNCHRONOUS REDUNDANT OPERATION MODE

(75) Inventors: Michael Rohleder, Unterschleissheim (DE); Joachim Fader, Munich (DE); Frank Lenke, Kirchheim (DE); Markus Baumeister, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 170 days.

(21) Appl. No.: 13/577,072

(22) PCT Filed: Feb. 16, 2010

(86) PCT No.: PCT/IB2010/050688
§ 371 (c)(1),
(2), (4) Date: Aug. 3, 2012

(87) PCT Pub. No.: WO2011/101707
PCT Pub. Date: Aug. 25, 2011

(65) Prior Publication Data
US 2012/0304024 A1 Nov. 29, 2012

(51) Int. Cl.
*G06F 11/00* (2006.01)
*G06F 9/28* (2006.01)
(Continued)

(52) U.S. Cl.
CPC .. *G06F 9/28* (2013.01); *G06F 9/38* (2013.01); *G06F 11/1645* (2013.01); *G06F 11/1695* (2013.01); *G06F 2201/845* (2013.01)

(58) Field of Classification Search
CPC ............ G06F 11/1629; G06F 11/1633; G06F 11/1637; G06F 11/1641; G06F 11/1695

USPC ...................................................... 714/10–13
See application file for complete search history.

(56) References Cited

U.S. PATENT DOCUMENTS 5,136,704 A 8/1992 Danielsen et al.
6,327,668 B1 * 12/2001 Williams .......................... 714/2
(Continued)

FOREIGN PATENT DOCUMENTS

EP 1496435 A1 1/2005
WO 2006032682 A1 3/2006
(Continued)

OTHER PUBLICATIONS

Mukherjee S.S. et al: "Detailed Design and Evaluation of Redundant Multithreading Alternatives" In: 29th ISCA 2002, Anchorage, AK, USA: IEEE Computer Society, May 25-29, 2002.
(Continued)

*Primary Examiner* — Scott Baderman
*Assistant Examiner* — Joseph Kudirka (57) ABSTRACT

A method of processing data in a data processor comprising at least two data processing units. The method comprises performing different data processing steps in the data processing units concurrently during a parallel operation, and replicating performances of selected identical data processing steps in the data processing units during a non-synchronised redundant operation. The non-synchronised redundant operation comprises an initial performance of the selected identical data processing steps in one of the data processing units and a replicate performance of the data processing steps starting later than the initial performance, preferably in another of the data processing units. Initial result data representative of results from the initial performance are registered, and compared with replicate result data representative of results from the replicate performance, and an error signal is produced in case of discrepancy.

20 Claims, 7 Drawing Sheets (51) Int. Cl.
*G06F 9/38* (2006.01)
*G06F 11/16* (2006.01)

(56) References Cited

U.S. PATENT DOCUMENTS

| | | | |
|---|---|---|---|
| 6,421,790 B1 | 7/2002 | Fruehling et al. | |
| 6,640,313 B1 * | 10/2003 | Quach | 714/10 |
| 6,907,443 B2 | 6/2005 | Murray | |
| 6,928,583 B2 * | 8/2005 | Griffin et al. | 714/11 |
| 7,020,798 B2 * | 3/2006 | Meng et al. | 714/6.31 |
| 7,308,605 B2 * | 12/2007 | Jardine et al. | 714/11 |
| 7,426,656 B2 * | 9/2008 | Bernick et al. | 714/12 |
| 7,472,051 B2 | 12/2008 | Mariani et al. | |
| 8,650,440 B2 * | 2/2014 | Rohleder et al. | 714/11 |
| 2002/0023202 A1 | 2/2002 | Mukherjee | |
| 2006/0095821 A1 | 5/2006 | Mukherjee et al. | |
| 2007/0277023 A1 * | 11/2007 | Weiberle et al. | 712/229 |
| 2008/0209251 A1 * | 8/2008 | Kottke | 713/501 |
| 2008/0229134 A1 | 9/2008 | Bose et al. | |
| 2008/0244305 A1 | 10/2008 | Troppmann et al. | |
| 2009/0044048 A1 * | 2/2009 | Weiberle et al. | 714/11 |
| 2009/0055674 A1 * | 2/2009 | Mueller et al. | 713/375 |
| 2009/0125749 A1 * | 5/2009 | Weiberle et al. | 713/501 |
| 2009/0164826 A1 | 6/2009 | Kottke | |
| 2010/0235558 A1 | 9/2010 | Snead | |
| 2011/0066779 A1 | 3/2011 | Bogenberger et al. | |

FOREIGN PATENT DOCUMENTS

| | | |
|---|---|---|
| WO | 2006045780 A1 | 5/2006 |
| WO | 2006045798 A1 | 5/2006 |
| WO | 2008146091 A1 | 12/2008 |

OTHER PUBLICATIONS

International Search Report and Written Opinion correlating to PCT/IB2010/050688 dated Nov. 17, 2010.

U.S. Appl. No. 14/496,552, filed Sep. 25, 2014, entitled "Electronic Fault Detection circuit".

* cited by examiner

PRIOR ART

FAULT TOLERANCE OF DATA PROCESSING STEPS OPERATING IN EITHER A PARALLEL OPERATION MODE OR A NON-SYNCHRONOUS REDUNDANT OPERATION MODE

FIELD OF THE INVENTION

This invention relates to a data processing method, a data processor and apparatus including a data processor.

BACKGROUND OF THE INVENTION

US Patent specification 2009/0164826 describes a data processor unit having at least two integrated execution units. Such a data processor unit is known as dual core or multi-core architecture and may be used in a computer system for applications critical with regard to safety, such as certain vehicle control applications, in a configuration in which the execution units redundantly process the same program elements in close synchronization in an error detection mode. Such a processor unit may also be used in a computer system for applications which are less critical with regard to safety in a performance mode in a configuration in which the two execution units or cores process different programs or tasks allowing enhanced performance, faster than the capacity of a single execution unit, since the execution units run in parallel. The processor unit described is capable of switching between an error detection mode and a performance mode.

Lock-step processing is an error detection mode of operation of a processor unit having redundant execution units, in which the redundant execution units run the same set of operations at the same time. Full lock-step operation requires synchronous processing of each of the operations and step-by-step comparison of the results of each operation from the different execution units. A device with the capability to perform lock-step processing as well as parallel independent processing requires to balance both modes, which often results in a suboptimal implementation for either mode.

Figure 1:
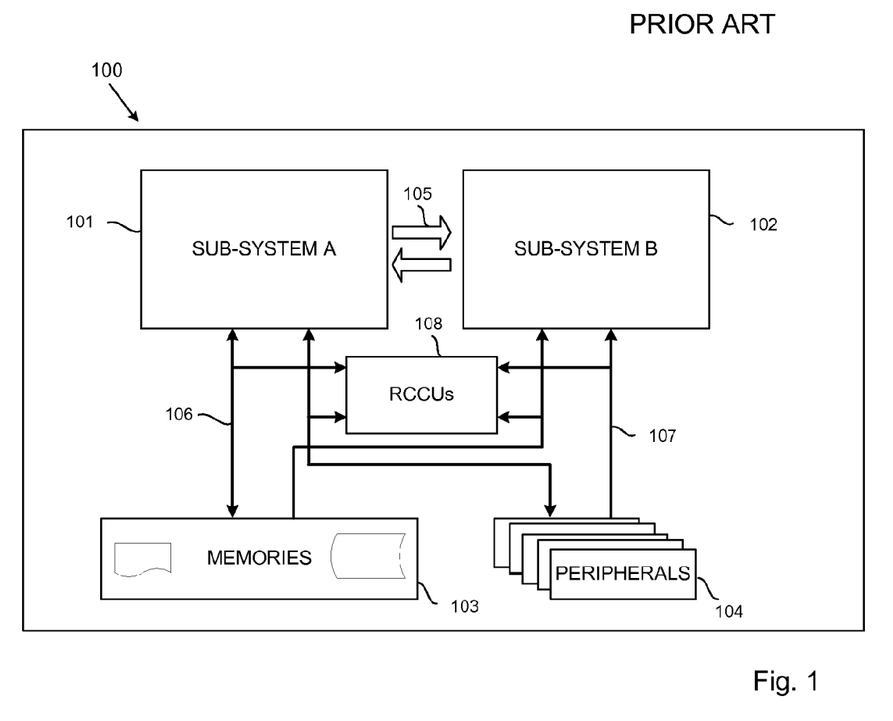
FIG. 1 is a schematic block diagram of a known dual-core data processor capable both of lock-step operation and of decoupled parallel operation.

FIG. 1 shows such a lock-step architecture. The execution unit subsystems 101 and 102 run in lock-step mode. The sub-systems 101 and 102 exchange data with each other and with memories 103 and peripherals 104 as shown by arrows 105, 106 and 107, respectively. Redundancy Control Checker Units (RCCUs) 108 compare all output data of the sub-systems and produce error data to alarm the system if the output data from the different sub-systems are different. Many additional connections are required to connect the RCCUs 108 to all data coming from the subsystems 101 and 102, especially because these connections and the RCCUs have to be redundant as well to reduce common cause failure possibilities.

Lock-step operation, as any redundant execution, approximately halves the available performance due to two cores executing the work of one. Decoupled parallel operation provides the full performance of a dual-core system but suffers a greater risk of undetected errors unless using software-synchronized replication of safety-relevant software. A hybrid system is possible which executes safety-relevant software in lock-step mode and non-safety-relevant software in decoupled mode.

In the lock-step process described in US Patent specification 2009/0164826, operation of one CPU is delayed relative to the operation of the other CPU, and the output of the other CPU is delayed by the same delay before comparison with the output of the delayed CPU, so as to restore synchronization for the comparison. This is typically called "delayed lock-step". In this way certain errors having common causes can be detected if they affect the two CPUs at different stages of execution. But this does not avoid the reduction in the performance due to redundant execution.

US Patent Specification 2008/0244305 also describes a method for delayed lock-step comparison of central processor unit ('CPU') outputs of a micro controller having a dual CPU architecture.

Our international Patent Application WO/2008/146091 describes a data processing system having components which are operable in a synchronized mode and a non-synchronized mode with respect to each other. A configuration control system may be arranged to enable, depending on the configuration, communication of data to the respective component via one or more selected data paths and to inhibit communication via the not selected data paths. The use of the resources, such as data processing capacity, memory use, bandwidth, and/or power consumption may be adjusted in the non-synchronised mode to the specific requirements of the application. Thereby, a more efficient use of the resources may be obtained. However, the speed of operation in the synchronized mode is not increased. This system performs explicit switching between the synchronized lock-step mode and non-synchronized decoupled parallel mode. However, the switching process is complex and time consuming as it flushes out buffers and synchronizes the internal states of both cores. Also switching between the two modes involves disabling interrupts which is normally acceptable only for very short time spans. European Patent specification EP 1496435 describes a data processing system stated to reduce software and hardware complexity using a fault tolerant processing unit for validation of operation of a CPU. However, the proposal requires pre-characterization of the software.

SUMMARY OF THE INVENTION

The present invention provides a data processor, a data processing method and apparatus including a data processor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 2:
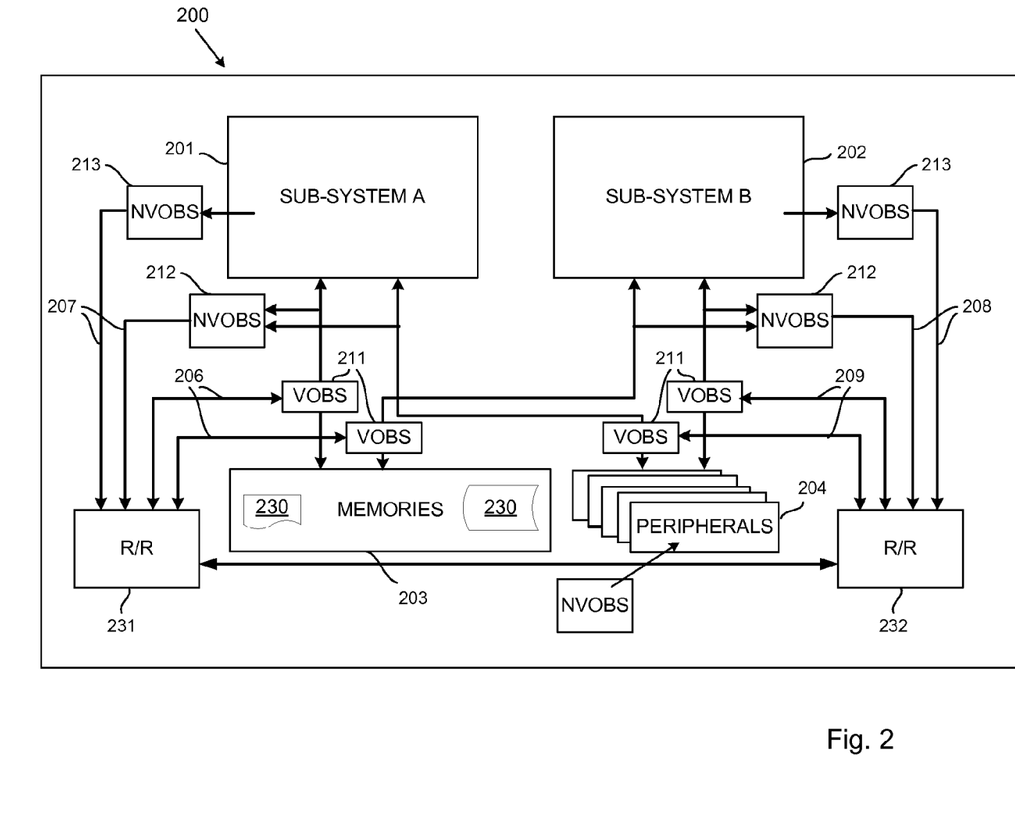
FIG. 2 is a schematic block diagram of an example of a dual-core data processor in accordance with an embodiment of the present invention, capable of both thread based redundant operation and decoupled parallel operation.

FIG. 2 is a block schematic diagram of a data processor 200 in accordance with an example of an embodiment of the present invention, simplified in order to illustrate the function of this example. The data processor 200 is a dual-core processor comprising two data processing unit sub-systems 201 and 202, although it will be appreciated that more than two data processing units could be provided in a multi-core processor. Each of the data processing units 201 and 202 implements a processing channel. Each processing channel will usually connect with one or multiple memory blocks 203, such as static random-access memory (SRAM), non-volatile random access memory (NVRAM) for example, with one or more peripherals 204 and optionally with other bus masters and other bus slaves (not shown).

The data processing units 201 and 202 are identical in this example, although it is also possible to implement a system of this kind with one sub-system as master and the other as slave. The data processing units 201 and 202 may be similar to the sub-systems 101 and 102 shown in FIG. 1. However, this embodiment of the invention is also applicable to other data processing units.

The data processing units 201 and 202 are capable of running completely decoupled, that is to say of performing different data processing steps concurrently during parallel operation. The data processing units 201 and 202 are also capable of replicating performances, that is to say of performing selected identical data processing steps during a non-synchronised redundant operation.

To achieve non-synchronised redundant operation, the data processor 200 includes at least one comparison module 231, 232 operational during the non-synchronised redundant operation to register initial result data representative of results from an initial performance of the selected identical data processing steps in a first one of the data processing units, to produce replicate result data representative of results from a later replicate performance of the data processing steps in a second one of the data processing units, to compare the replicate result data with the initial result data, and to produce an error signal in case of discrepancy between the replicate result data and the initial result data.

In this embodiment of the invention, the data processor 200 comprises software 230, which may be stored in one of the memories 203, and which includes an operation controller for selecting the parallel operation or the non-synchronised redundant operation. The selection of parallel or redundant operation for given data processing steps may be related to an operating system task, to a software processing thread, as a function of position in a sequence of the data processing steps, or as a function of a memory address for the data processing steps, for example. The comparison module of this embodiment of the invention includes a Record/Replay ('R/R') facility operational during the non-synchronised redundant operation, the R/R facility comprising respective R/R blocks 231 and 232 coupled with the data processing units 201 and 202. The R/R blocks 231 and 232 register the initial result data from the initial performance of the selected identical data processing steps, compare the replicate result data with the initial result data, and produce an error signal in case of discrepancy between the replicate result data and the initial result data. However, it will be appreciated that the R/R blocks 231 and 232 may be combined in a single facility.

In addition, in this embodiment of the invention, the comparison module includes a set of observation units to register data that is defined as critical, that is to say data from critical connections, or the output of critical execution units, or values within critical execution units that are to be monitored regularly within the two sub-systems 201 and 202. The selection of critical connections or critical execution units to be monitored is product specific and will vary between products. The data monitored may include data selected as being sensitive to execution errors or to errors of transmission and reception, for example caused by hardware failures or by electromagnetic interference. Examples of data which may be significant in this respect are instruction codes, instruction addresses, write and read data and addresses, and system status information, among others.

In this embodiment of the invention, there are two kinds of observation units, a first kind of observation unit NVOBS 212 for monitoring non-volatile information, while a second kind of observation unit VOBS 211 is defined for volatile information. In this embodiment of the invention, NVOBS 212 monitor connections transmitting non-volatile information and NVOBS 213 monitor non-volatile information made available by data processing unit subsystems 201 or 202. Volatile information may be input data or data that is modified by a processing step, usually while executing a software program, or data that is not stable over the time between initial performance and replicate performance.

Examples for volatile data are:
⇒ Values of program variables that are modified: e.g. "A=A+B"
⇒ Content of peripheral registers that are modified by an access of this information: e.g. the content of a status register or the content of a first-in-first-out ('FIFO') register
⇒ Peripheral registers that are volatile by nature: e.g. the conversion result of an analogue-to-digital converter ('ADC')

Examples for non-volatile information are:
⇒ The trace of instructions executed by a software program, as long as this instruction stream is not interrupted.
⇒ Non-modifiable data values (e.g. an array of calibration values or other constant data)
⇒ Address and access information (e.g. byte enables, read/write, access size etc.) related to accesses to volatile information
⇒ The majority of system status information or critical system control data In this embodiment of the invention, the observation units for non-volatile information NVOBS 212 and 213 condense the observed information to a single observation result after being initialized, reducing the quantity of data to be stored, transferred and compared. The observed data may be recorded directly in the corresponding R/R unit 231, 232 before being condensed by the respective observation unit by calculating a hash code. However, the received data may alternatively be condensed by the respective R/R unit 231, 232 calculating a hash code as the data is received. An example of a suitable hash code register is a multiple input signature register ('MISR') but other hash functions and codes may be used. The R/R units 231 and 232 compare the condensed codes of data used during the initial performance with that used during the replicate performance, to check that there is no error in the non-volatile information used.

In this embodiment of the invention, the observation units for volatile information VOBS 211 have two processing modes: during the initial performance 402, the VOBS 211 function in the recording mode (see FIG. 4), and forwarding the observed information to the connected R/R block 231 or 232 for further processing, while during the replicate performance, the VOBS 211 function in the replay mode 404, forwarding the data recorded during the initial performance provided by the connected R/R block 231 or 232 instead of the currently observed information. Additionally it is possible to optionally compare the received observed information with the recorded information in the replay mode during the replicate performance 404. The VOBS 211 record the volatile data accessed in the recording mode during the initial performance 402 so that the replicate performance 404 can use the same data. The recorded volatile data can be compressed without loss before being recorded and decompressed when replayed, although a hash code is inappropriate for the compression. Additionally, or instead, the VOBS 211 can verify that the data used has the same values by recording sufficient information defining properties of the data to validate the data actually used. Additionally, or instead, the VOBS 211 can prevent modification of intermediate values of volatile data during the replicate performance 404.

In this embodiment of the invention, there is an R/R unit attached to every processing channel, the R/R unit 231 to the data processing unit subsystem 201 and the R/R unit 232 attached to the data processing unit subsystem 202. The R/R units themselves are connected with redundant connections, which transport the same information from one unit to the other. Additionally the R/R units can be accessed by the data processing unit sub-systems 201,202 like any other peripheral 204.

Figure 3:
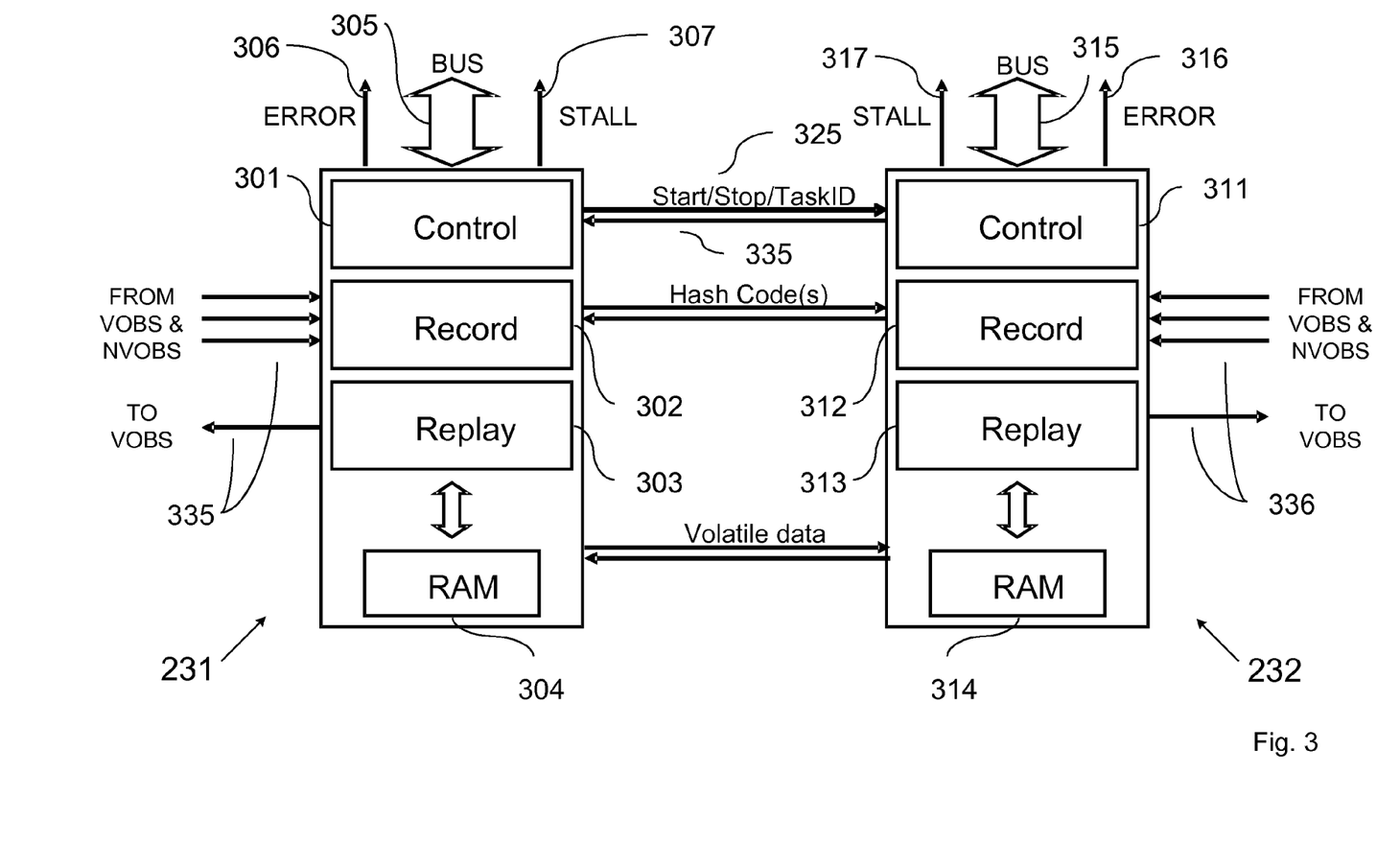
FIG. 3 is a schematic block diagram of an example of a Record/Replay unit in a processor of the kind shown in FIG. 2.

FIG. 3 shows the internal elements and connections of an example of an R/R unit 300 for the data processing system 200 comprising R/R blocks 231 and 232 and how the blocks interact.

The R/R blocks 231 and 232 comprise control sub-blocks 301 and 311 which contain configuration registers that can be accessed by register read/writes over buses 305 and 315. The sub-blocks 301 and 311 start and stop the operation of the corresponding R/R block 231 or 232 and provide an error flag 306 or 316 for indicating comparison errors. The sub-blocks 301 and 311 also provide a stall request 307 or 317 to the system 200 in case the R/R block 231 or 232 needs to halt the related sub-system. The R/R block 231 also comprises a record block 302, a replay block 303, and a memory element 304 for storing volatile information, which the control sub-block 301 also controls. The R/R block 232 also comprises a record block 312, a replay block 313, and a memory element 314 for storing volatile information, which the control sub-block 311 also controls.

During redundant operation, the record blocks 302 and 312 receive comparison information from the observer units VOBS and NVOBS, and process the received information on request of the control block 301 or 311. In record mode, the control unit 301 or 311 selects the comparison information being used and sends it to the other R/R unit for validation purposes. In replay mode, the comparison information received from the observer units VOBS and NVOBS is compared against the information received from the record mode R/R unit and provided by the replay block 303 or 313. When a R/R unit is operating in record mode, volatile data received from a VOBS element is immediately sent by the record block 302 or 312 to the other R/R unit. The replay mode R/R unit stores this data into its memory element 304 or 314 for later usage by the replay block 303 or 313. However, non-volatile information received from an NVOBS element is not necessarily sent to the other R/R unit immediately after it is received and in one example of an embodiment of the invention, only a hash code of the non-volatile information received from an NVOBS element is sent to the other R/R unit, for checking against a hash code generated similarly of the non-volatile information received by the other R/R unit to detect errors in the non-volatile information used by the two sub-systems 201 and 202.

During performance of the data processing steps in redundant mode, each of the record blocks 302 or 312 receives critical information data from the observer units of the sub-system portion in which it is situated, as shown by the arrows 335 and 336. The same or equivalent data are received by the other of the record blocks 302 or 312 from the observer units of the sub-system in which it is situated during replicate redundant performance of the same, identical data processing steps.

The replay block 303 or 313 receives volatile information from the record block 302 or 312 of the other R/R unit and stores it into the memory 304 or 314 for later usage during the replicate performance. When entering the replay mode, the memory 304 or 314 for this replay block provides the next set of previously stored volatile information to the associated VOBS units, which then provide this data to the associated data processor sub-system 201 or 202 so as to ensure equivalent volatile data for execution of the replicate performance of the identical data processing steps. This stored volatile data can also be used to compare intermediate values, an option which can be enabled either statically or by the control block 301 or 311. The replay block 303 or 313 also indicates to the control block 301 or 311 when the replay process needs to be stalled due to the corresponding recording operation being halted (for example due to an interrupt being served).

In this embodiment of the invention, during redundant operation each of the R/R units 231 or 232 is operational to calculate an initial hash code or a replicate hash code representative of results from respectively an initial performance or a replicate performance of the selected identical data processing steps in its associated data processor sub-system 201 or 202. At least one of the R/R units 231 or 232 is operational to receive the initial result hash code or the replicate hash code from another R/R unit together with a start or termination flag and information about the selected identical data processing steps of the task to be executed, After the replicate performance, this one of the R/R units 231 or 232 compares the replicate result hash code with the initial result hash code for this task, and produces an error signal in case of discrepancy between the replicate hash code and the initial hash code for this task.

In more detail, the control block 301 or 311 provides to the other R/R unit 232 or 231 over the communication channel 325 or 335 a start indicator tagged with information about the software task to be processed redundantly in its associated data processor sub-system 201 or 202. This is only done when a processing step is started by one R/R unit, putting this unit either in record mode (if it is the first unit receiving the corresponding command) or in replay mode (when it is a subsequent unit receiving the corresponding command). Upon reception of a termination command, the R/R unit either finishes the recording (when in record mode) or (when in replay mode) finishes the replay mode, calculates the result data representative of results from the performance of the data processing steps and performs all appropriate checking needed to determine a correct and complete redundant execution. This will usually involve the following checks:

⇒ All checksums/hash codes/syndromes calculated by both R/R units (initial checksum/hash code/syndrome vs. replicate checksum/hash code/syndrome) are equivalent ⇒ All recorded volatile information has been validated in order and matches when compared, no further or additional data is remaining In the data processor 200, each of the R/R units 231 and 232 is capable of sending the calculated hash code to the other R/R unit 231 or 232, of receiving calculated hash codes from the other R/R unit 231 or 232, and of comparing the received hash code or codes with the hash code it has calculated for its own data processing unit sub-systems 201 and 202. However, in other embodiments of the invention, for example where the data processing units 201 and 202 function on a master/slave basis, one or more of the comparison elements 231 or 232 may be capable only of sending its calculated hash code to another comparison element 232 or 231, and the other comparison element 232 or 231 always receives the hash code from the other comparison element or elements 231 or 232, and compares the received hash code or codes with the hash code it has calculated for its own data processing units 202 or 201

The example of data processor 200 shown in FIG. 2 comprises two of the data processing units 201 and 202 and respective comparison elements R/R unit 231 and 232. However, it will be appreciated that more than two data processing units such as 201, 202 may be provided, similarly with the R/R units 231 and 232. In one example of an embodiment of the invention the hash codes are calculated and verified within the VOBS and NVOBS observer units 211, 212 and 213 and then forwarded to the R/R units 231 and 232. In another example of an embodiment of the invention the hash codes are calculated and/or verified in blocks of the R/R units 231 and 232 themselves. Similarly the recording and replay operation can be differently implemented within the R/R unit or related blocks. Also there may be a single R/R unit or a different number of R/R units and observation units and the corresponding interactions may also differ from those described above.

As will be understood from the above description, the system 200 makes no continuous comparison of the data processing steps of the two data processing subsystems 201 and 202 during redundant operation, as does the prior art data processing system 100, using RCCU's or similar comparison elements. There is no lock-step operation implemented within the system 200. Lock-step operation is not needed, because the data processing subsystems run non-synchronously during redundant operation. The comparison of the redundant execution is achieved by registering initial result data representative of results from an initial performance of the selected identical data processing steps in a first one of the data processing units 201 or 202 and by comparing the registered initial result data with replicate result data representative of results from a later replicate performance of identical data processing steps in a second one of the data processing units. The volatile information used for the initial performance is recorded and/or provided with validation under the control of the R/R unit 231 or 232 for the replicate performance.

Reception of the selected data and calculation of the hash code(s) may be activated and terminated by writing a start key and a termination key into the instructions. Alternatively, reception of the selected data and calculation of the hash code may be activated and terminated by reaching specific addresses during the data processing operation. The length of time for which the selected data are received and the hash code calculated is chosen to enable a high probability that errors will be detected, while avoiding excessive exchanges of hash codes.

Error signals produced by the R/R units 231, 232 may be used by the application software for display and/or corrective action. For example, the error signals may trigger internal test routines, re-routing of data or processing, and/or deactivation of a faulty unit.

Figure 4:
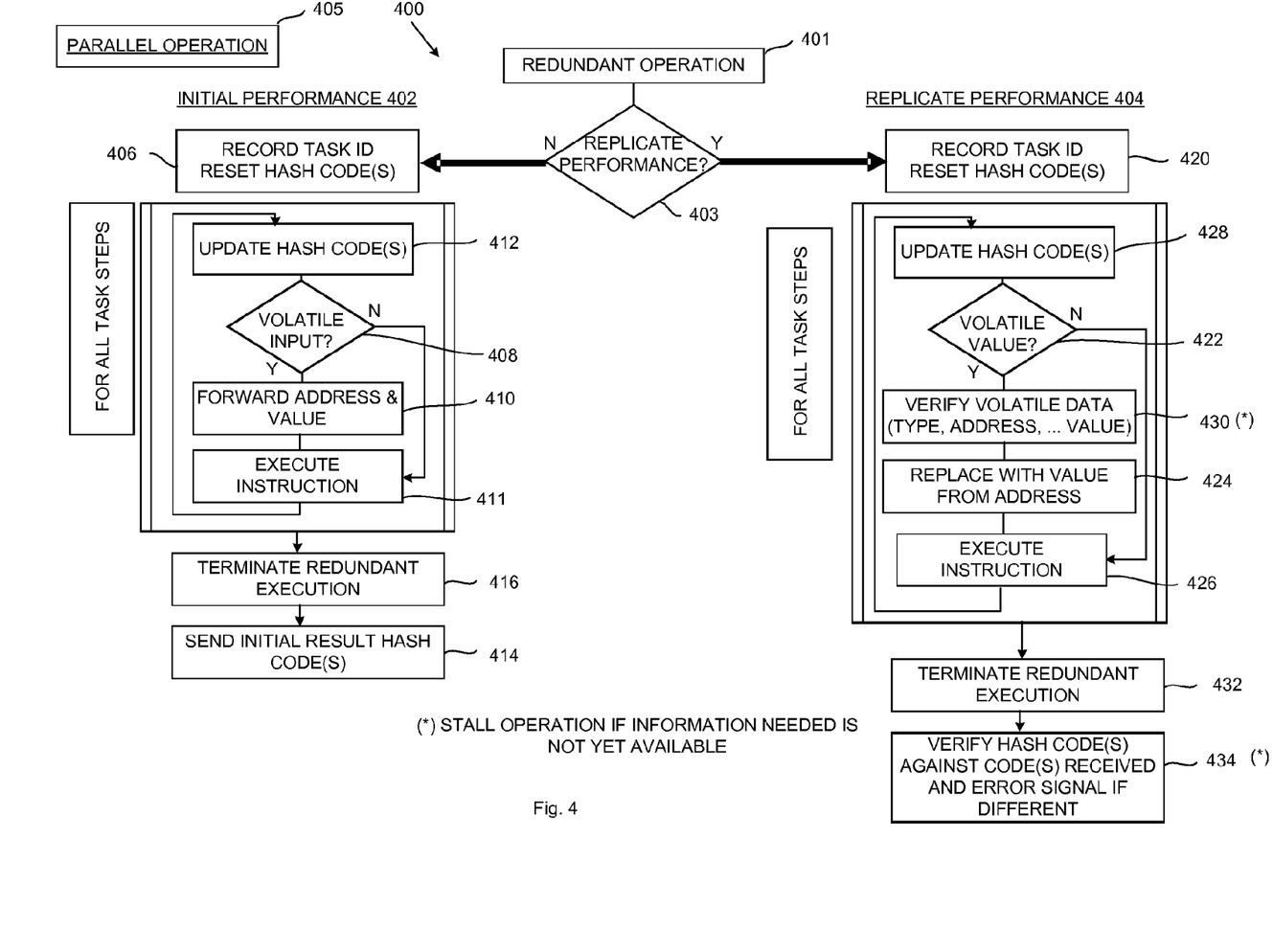
FIG. 4 is a simplified flow chart of an example of a data processing method applicable to the dual-core data processor of FIG. 2, comprising redundant operation in detail and decoupled parallel operation (but not in detail)

FIG. 4 shows an example of a method 400 of processing data in accordance with an example of an embodiment of the invention using two data processing sub-systems such as 201, 202 in a data processor such as 200 for example. In the method of FIG. 4, the data processing units always execute instructions non-synchronously, either in parallel operation 405 or in redundant operation 401. Parallel operation 405 comprises performances of different data processing steps concurrently in the data processing sub-systems 201 and 202. The non-synchronised redundant operation 401 illustrated in FIG. 4 comprises replicating performances of selected identical data processing steps of a specific task by two data processing units. It is also possible to replicate performances of selected identical data processing steps of a specific task in a single processing sub-system (in successive phases) or in more than two data processing sub-systems.

In another embodiment of the present invention, for non-synchronised redundant operation, initial and replicate performances of the selected identical data processing steps of a specific task are executed successively by the same data processing sub-system 201 or 202. Only a single set of one R/R unit 231 or 232 and VOBS and NVOBS observer units 211, 212 and 213 are needed. However, the diagnostic capability of errors, especially of permanent errors, is reduced. Explicit notification is provided to the R/R unit whether the initial or replicated performance is currently under execution.

In the method 400, the non-synchronised redundant operation comprises an initial performance 402 of the selected identical data processing steps in one of the data processing units and a replicate performance 404 of the data processing steps starting later than the initial performance 402 in another of the data processing units. Initial result data representative of results from the initial performance 402 of the selected identical data processing step are registered at 412 and forwarded at 414 to other processing units. Replicate result data representative of results from the replicate performance 404 of the selected identical data processing steps are produced at 428. The replicate result data are compared with the initial result data and an error signal is produced at 434 in case of discrepancy between the replicate result data and the initial result data. In the example of an embodiment of the invention illustrated in FIG. 4, registering and comparing initial and replicate result data comprises computing and registering at 412, and forwarding to the other processing unit(s) 414 an initial hash code of data resulting from an initial performance of the data processing steps in a first one of the data processing sub-systems 201 or 202, and at 428 computing a replicate hash code of data resulting from a replicate performance of the data processing steps in a second one of the data processing units 202 or 201, and finally at 434 comparing the replicate hash code with the initial hash code, and producing an error signal in case of discrepancy between the replicate hash code and the initial hash code.

The example of a method 400 of processing data in redundant mode 404 illustrated in FIG. 4 comprises computing and registering 412, and forwarding 414 the initial hash code of data within the first one of the R/R units 231 or 232 and/or associated observer units such as the VOBS 211, and computing and registering 428 the replicate hash code of data within the second one of the R/R units 232 or 231 and/or associated observer units such as the VOBS 211. At least one of the first and second R/R units 231 or 232 receives at 414 the computed hash code from the other of the first and second R/R units 232 or 231 and/or associated observer units such as the VOBS 211, compares at 434 the replicate hash code with the initial hash code, and produces an error signal in case of discrepancy between the replicate hash code and the initial hash code. Either the initial hash code or the replicate hash code could be sent to the other R/R unit 231 or 232 for comparison but in this example the initial hash code is sent to the other R/R unit or units for comparison with the locally computed replicate hash code.

In the example of a data processing method 400 illustrated in FIG. 4, by default the R/R units 231 and 232 are deactivated and the system 200 operates in decoupled parallel operation 405 with the data processing sub-systems 201 and 202 executing different processing steps without any comparison of their results. The redundant operation 401 of a specific safety-critical task by the data processor 200 may start, for example by reading a start key or on reaching a specific address in the process within the first sub-system executing this task.

On occurrence of a request for redundant operation 401, the redundant operation starts by the first sub-system 201 or 202 executing this task as an initial performance 402. The corresponding R/R unit 231 or 232 is activated at 406, records the task ID, informs the other R/R unit 232 or 231 about the activation and computes the initial hash code for this task at 412 while the task is being processed by the observed sub-system. At an arbitrary time later a second data processing sub-system such as 202 or 201 starts to perform the same, identical process steps executing the same task as a replicate performance 404. The corresponding second R/R unit 232 or 231 is activated at 420 and then computes the corresponding redundant hash code at 428 for the redundant execution of this task. For this purpose, it is not necessary for any transaction of the two execution processes to be synchronized, with or without delay, and the activities of the data processing units such as 201,202 may be completely asynchronous, including the exchange of hash codes.

Upon completion of the second, replicated redundant execution of the task by the replay data processing sub-system(s), the corresponding R/R unit (or units) informs the first R/R unit about the termination of this replicate execution 404 at 432, along with the optional transmission of the calculated hash code. The hash code may be compared at 434 by both R/R units or only by the one performing the replicate redundant calculation, as illustrated in this example. In case the replicate redundant processing 404 of a task is not started or is not completed within a defined time frame from the initial performance 402, the first R/R unit executing such a task will itself issue an error indication. The operation will now be described in more detail for the case where there are only two data processing sub-systems 201 and 202 although it will be appreciated that the operation can be performed with more than two. Redundant operation 400 starts with the receipt of a request for redundant operation 401. The first of the R/R units 231 or 232 to be activated performs in initial performance (or record mode) 402 and the other R/R unit 232 or 231 starts later in replicate performance (or replay) mode 404, the decision being taken at 403. A request for an operation other than a redundant operation in this example of an embodiment of the invention is taken as a request for an independent execution in parallel operation 405 of different data processing steps by the data processing sub-systems 201 and 202.

The record mode 402 starts at 406 with the start of the initial process activity of the corresponding one of the data processing units 201 or 202 by recording the task ID and resetting previously registered data from a previous task, especially previous result data (hash codes). In order to ensure valid comparison of the results of the process steps in non-synchronous redundant operation, if input data comes from sources known to be volatile at 408, it is sent at 410 to the other replay R/R unit 231 or 232, which records the volatile data used in the initial performance with an identification of the write address and uses the recorded data in the replay mode 404 instead of the corresponding values on the bus. In this example of an embodiment of the invention, the volatile input data is also condensed to hash codes during the initial performance 402 in the record mode R/R unit 231 or 232. Non-volatile data may also be condensed to hash codes if desired for checking purposes. Examples of volatile input data which may be sent at 410 to the replay mode R/R unit 231 or 232 are read results from RAM and read results from peripherals.

Additionally, volatile write operations to RAM and to peripherals may be suppressed at 424 in the replay mode 404. The data processing unit sub-system 201 and 202 then executes the initial performance 402 of the redundant operation data processing step at 411. While the data processing sub-system 201 or 202 is performing the initial performance 402, the other data processing sub-system 202 or 201 can perform different data processing steps in parallel operation 405 or in redundant operation 401 (for a different redundant operation or for the same redundant operation, but with a delayed start). At each step of the process, the record mode R/R unit 231 or 232 captures and registers the result data with the selected data from the data processing unit 201 or 202 in which it is situated. The record mode R/R unit 231 or 232 immediately calculates and updates an initial result hash code, such as an MISR code, for example, condensing the data resulting from the data processing operation in the sub-system 201 or 202 to a single result number, which is updated and registered at 412. In case of an exception or interrupt or other interruption to the data processing steps of the initial performance 402 or the replicate performance 404 of a redundant execution 401, all hash calculations, recording processes or related comparisons corresponding to the initial or replicate performance are suspended during the processing of the exception or interrupt. After returning to the initial or replicate performance when the exception or interrupt is finished, the suspended data processing steps will resume in the state they were at before entering the interrupt. The processing of an interrupt or exception itself may be another redundant execution like 401 having its own hash calculation, recording process and comparison information. This way multiple nested redundant operations can be performed concurrently, and interrupted independently without any need for synchronization. When the current process activity of the record mode data processing unit 201 or 202 terminates at 416, in response to a termination key or a specific address in the process for example, the complete initial hash code is sent at 414 to the replay mode R/R unit 232 or 231.

The replicate performance 404 in replay R/R unit (or units) 232 or 231 which is activated later starts at 420 in the corresponding one of the data processing units 201 or 202. The replicate performance 404 starts later than the initial performance 402 and may overlap the initial performance 402 in time. If volatile data is detected at 422 during the replicate process activity, it is replaced at 424 with data recorded during the initial performance, as and when needed during the replicate process activity. The data processing unit sub-system 202 or 201 then executes the replicate performance 404 of the redundant operation data processing step at 426.

At each step of the replicate performance 404, the replay R/R unit 232 or 231 captures and registers the result data with the selected data from the data processing unit 201 or 202 in which it is situated. The replay R/R unit 232 or 231 immediately calculates and updates a replicate hash code, using the same hash algorithm as the record R/R unit 231 or 232, condensing the data to a single number, which is updated and registered at 428.

The complete initial hash code is received at 414 from the record mode R/R unit 231 or 232. When the current processing activity in the replicate operation 404 of the corresponding data processing unit 201 or 202 terminates at 432, in response to the termination key or the specific address in the process for example, the complete replicate hash code is compared at 434 with the complete record hash code received. If the replicate result hash code is equal to the record hash code, the replay R/R unit 231 or 232 terminates the replay mode 404 at 434 without sending an error signal. In another example of redundant operation 401, the replay mode R/R unit 232 or 231 sends a confirmation signal at 434 if no error is detected. At 434, if the replicate result hash code is different from the record result hash code, the replay R/R unit 231 or 232 sends an error signal and terminates the replay mode 404.

In the example of FIG. 4, during the redundant mode of operation 401, the effects of pre-fetching may be eliminated so as to compare only data actually used and their results on the record and replicate processes. The impact of process interrupts on the record and replicate operations 402 and 404 may be reduced by increasing the threshold for interrupt priority temporarily. The impact of exceptions and interrupts is further reduced in the processor of FIG. 2 and the method of FIG. 4 since precise synchronization is not required and the hash calculation and registering are deactivated for the duration of the exception or interrupt.

In the example of FIG. 4, during the replicate performance 404, timeout limits may be provided to assert continuously reliable operation and required comparison parameters. In one example, such timeout limits are imposed on the maximum runtime of a safety thread, the maximum runtime of an interrupt/exception, the maximum lock delay when replicating volatile data, and the maximum delay between the data processing units 201 and 202 for a safety thread.

Figure 5:
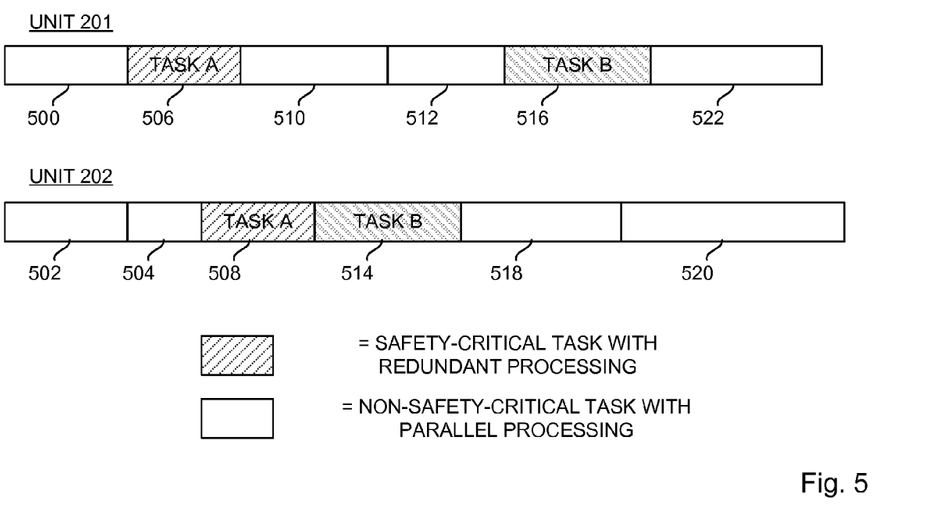
FIG. 5 is a timing chart illustrating an example of processing steps using the data processing method of FIG. 4 for redundant tasks A and B.

FIG. 5 is a timing diagram illustrating an example of operation of the data processor of FIG. 2 or of the method of FIG. 4 when two data processing units 201 and 202 are performing a mixture of safety critical and non-safety critical tasks. The operation is shown by way of example as starting with a non-critical task 500 performed in data processing unit 201 and non-critical tasks 502 and then 504 performed in data processing unit 202. The data processing units 201 and 202 operate in decoupled parallel mode to perform the tasks 500, 502 and 504 asynchronously.

After the task 500, the data processing unit 201 is the first of the two data processing units 201, 202 to start a safety critical task A 506. Starting the safety critical task 506 triggers the redundant mode of operation and the data processing unit 201 performs the task 506 with the R/R unit 231 in record mode 402. When the task 504 is terminated or interrupted, the data processing unit 202 starts also task A 508 in the redundant mode of operation, the task 508 replicating the task 506 with the R/R unit 232 in replay mode 304. When the data processing unit 201 has terminated the task 506, it does not need to wait for synchronization with the data processing unit 202 before starting other tasks 510 and 512, non-safety critical in this example.

In this example of operation, the hypothesis is made that the replication task 508 terminates with an error signal identifying that results of the replication task 508 and of the initial task 506 were not identical. The data processing unit 202 starts a safety critical task B 514 to trigger a corrective action, or a test action for example, with the R/R unit 232 in record mode 402. When the task 512 is terminated or interrupted, if necessarily prematurely so as to minimise time lag, the data processing unit 201 starts a task B 516 in redundant operation, the task 516 replicating the task 514 with the R/R unit 231 in replay mode 304. When the data processing unit 202 has terminated the task 514, it does not need to wait for synchronization with the data processing unit 201 before starting other tasks 518 and 520, non-safety critical in this example. In this example of operation, the hypothesis is made that the replication task 516 terminates without any error signal, signifying that results of the replication task 516 and of the initial task 514 were identical and verifying the corrective or test action. The data processing unit 201 can then start a further task 522.

In one example of an embodiment of the invention, the data processing units (201, 202) are operable to perform data processing steps with different clock speeds during the parallel operation and also during the non-synchronised redundant operation. This is possible since synchronisation between the data processing units is not necessary even during redundant operation.

It will be appreciated that the processor of FIG. 2 and the methods of FIG. 4 and FIG. 5 can offer detection granularity to a fine degree by comparison of independently executed identical software threads. The amount of data to be exchanged and synchronized across sub-system boundaries in the redundant mode of operation is substantially less than in the case of a dual core-system employing full lock-step operation. The number of interconnections between the sub-systems needed for the redundant mode of operation is also substantially less than with full lock-step operation. The decoupled parallel mode of operation enables full advantage to be taken of the higher performance mode offered by the dual or multi-processor structure.

Figure 6:
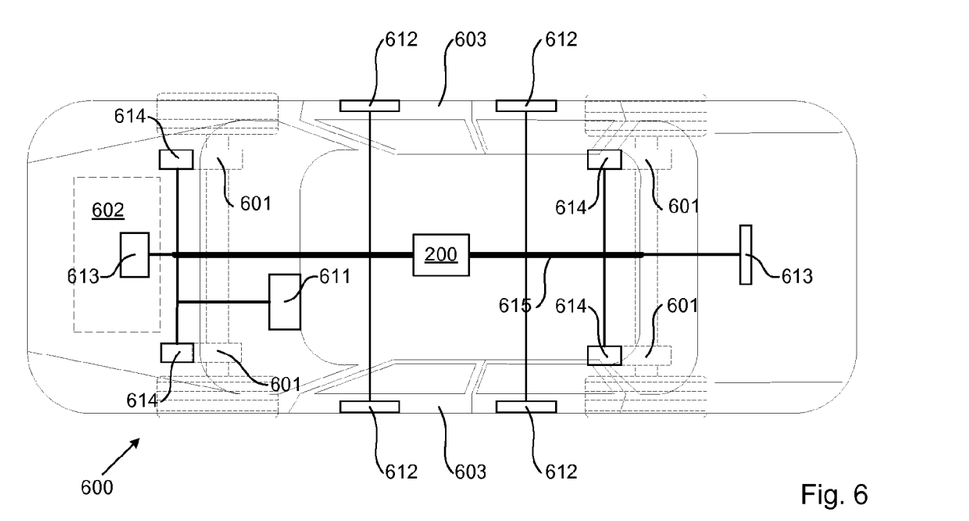
FIG. 6 is a schematic diagram of an application of the dual-core data processor of FIG. 2 in a vehicle.

The data processing system 200 may for example be included in an apparatus, for example, in a stationary system or in a vehicle, such as a car or a plane or other type of vehicle. FIG. 6 shows an example of vehicle 600 in which a data processor 200 is provided. The example shown in FIG. 6 includes an engine 602. An engine control node 613 may be present which can control and monitor the engine 602. The vehicle may further have brake control nodes 614 which can control and monitor the brakes 601. The vehicle 600 may also have door lock control nodes 612 which can actuate the locking and unlocking of doors 603 of the vehicle 600. The nodes 612-614 may be connected to a display node 611 via a connection 615. At the display 611, for example, data can be outputted in a form perceptible by humans, for example, displaying to an occupant of the vehicle whether or not the doors 603 are shut, the vehicle and engine speeds and warnings of any failures or errors detected by the data processor 200. The nodes 611-614 may, as shown in FIG. 6, be connected to the data processor 200 and may, for example, transmit sensor data to the data processor 200 which may then be used by an application running on the data processor 200 to send node control data to drive the display and control actuators in the engine or the brake control nodes.

In an example of an application, data processors such as 200 forming parts of different micro-controller units ('MCUs') may be linked together over a network and execute instructions non-synchronously, either in parallel operation 405 or in redundant operation 401, the MCUs communicating over the network in the redundant operation.

Figure 7:
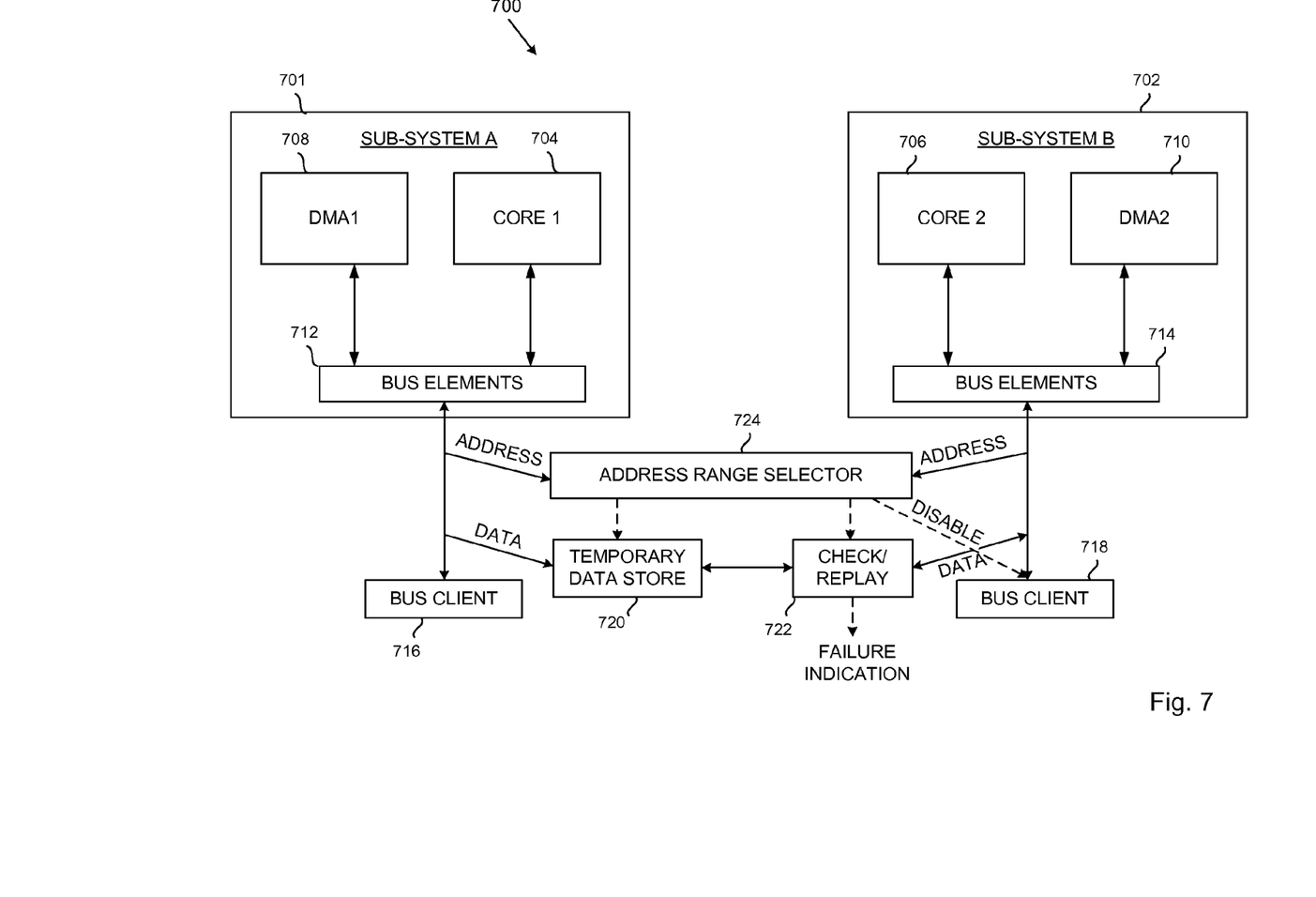
FIG. 7 is a schematic block diagram of an example of a dual-core data processor in accordance with another embodiment of the present invention, capable of both thread based redundant operation and decoupled parallel operation.

FIG. 7 is a block schematic diagram of a data processor 700 in accordance with another example of an embodiment of the present invention, simplified in order to illustrate the function of this example. Like the data processor 200, the data processor 700 is a dual-core processor comprising two data processing unit sub-systems 701 and 702, although it will be appreciated that more than two data processing units could be provided in a multi-core processor.

In the data processor 700, the sub-systems 701 and 702 comprise respective processing cores 704 and 706, direct memory access ('DMA') elements 708 and 710 and bus elements 712 and 714 for transferring data between the respective core, DMA element and respective bus clients 716 and 718, such as system RAM or input/output devices. The two bus clients shown do not necessarily represent two different clients, they can also be two interfaces to the same client.

In the data processor 700, the data processing units 701 and 702 are capable of running completely decoupled, that is to say of performing different data processing steps concurrently during parallel operation and are also capable alternatively of performing selected identical data processing steps during a non-synchronised redundant operation, which may be performed with the data processing units 701 and 702 also running completely decoupled to execute initial and replicate performances of the same identical data processing steps.

To achieve non-synchronised redundant operation, the data processor 700 includes a VOBS unit for observing and handling volatile data. In this embodiment of the invention, the VOBS unit consists of a temporary data store 720, a data check and replay unit 722, and an address range selector and comparison unit 724. The temporary data store 720 is accessible to both the data processing units 701 and 702 during the non-synchronised redundant operation to register initial result data representative of results from an initial performance of the selected identical data processing steps in a first one of the data processing units 701 or 702. In the example shown in FIG. 7, the data processing unit 701 is the unit that executes the initial performance. The temporary data store 720 also stores all volatile input data used during the initial performance, and may not need to store non-volatile input data used during the initial performance. This stored data is indexed with the address it was written to respectively the one it was retrieved from.

The other of the data processing units 702 is arranged to use the input data stored in the temporary data store 720 to produce replicate result data representative of results from a replicate performance of the data processing steps starting later than the initial performance. To achieve this, the data processor 700 also includes a check/replay unit 722. The check/replay unit 722 is arranged to retrieve the data stored in the temporary data store 720 as a function of the corresponding stored address identification, based on the address the replay subsystem 702 uses for its access to the bus client. In case of a write operation the check/replay unit will then compare the results produced by the replay subsystem 702 with the initial results written previously by the initial subsystem 701 to the same address and produces an error signal or other failure indication in case of discrepancy between the replicate result data and the initial result data, or if no access from subsystem A to this address is registered. In case of a read operation to volatile data, the replay subsystem 702 will not receive its results from its bus client 718. Instead the check/replay unit 722 will replay the initial results retrieved by the initial subsystem 701 or 702 from the same address to the bus 714 of the replay subsystem. The results of the initial performance are not only stored in the temporary data store 720 but also are passed through to the corresponding bus client 716 or 718. In any case if accesses of the initial subsystem 701 are not repeated by the replay subsystem 702 within a certain timeout period, a failure will be indicated.

To distinguish accesses of the subsystems the address range selector unit 724 is included. During initialisation of the system it is programmed with information on which address ranges are considered safety-relevant, and which of those are volatile and which non-volatile. During operation it classifies the accesses of the subsystems accordingly, and controls the temporary data store 720 and the check/replay unit 722: For an address not marked as safety-critical both the temporary data store 720 and the check/replay unit 722 will remain unused and the sub-systems 701 and 702 are free to perform parallel operation. For a read to a non-volatile safety critical address the initial address will be stored and the redundant address will be compared. For a volatile safety-critical address the initial results of reads and writes will be stored. Redundant write data for such an address will be compared by the check/replay unit 722 and access to the actual bus client 718 will be blocked. Redundant reads from such an address will be replayed by the check/replay unit 722 as described above. The overall control function will be further explained below.

The temporary data store 720 of this example of an embodiment of the invention comprises a dual-port RAM dedicated to temporary store of the input data used during the initial performance. In another example of an embodiment of the invention, the temporary data store 720 comprises a plurality of first-in-first-out ('FIFO') buffers. Alternatively, the temporary data store 720 may comprise single-port RAM.

One example of an embodiment of the Address range selector 724 includes it with the Memory Protection Unit (MPU) available in modern computing architectures as that unit also defines and supervises address ranges and bus requests. However, the Address range selector 724 can also be implemented without such a merger of units and also if no MPU is available in the system at all.

In the example shown in FIG. 7, the data processing unit 701 is the unit that executes the initial performance and the data processing unit 702 is the unit that executes the replicate performance. In one example of data processor 700, the same data processing unit 701 always executes the initial performance during redundant operation. However, in another example of data processor 700, either of the data processing units 701 or 702 may execute the initial performance during redundant operation, the first unit to reach a request for redundant operation being selected for the initial performance. In this case additional connections not shown in FIG. 7 are necessary to achieve mirror symmetry. In another example of an embodiment of the invention, for non-synchronised redundant operation, initial and replicate performances of the selected identical data processing steps of a specific task are executed successively by the same data processing sub-system 701 although the diagnostic capability of errors is reduced.

In case of a volatile address range the results of the replicate performance from the replay sub-system 702 (or 701) are not passed through to the corresponding bus client 718 (or 716), the corresponding output being blocked by the address range selector 724 during the replicate performance. This avoids volatile address ranges reacting directly to writes (in case of I/O registers) or being overwritten with other data by the initial performance of the other subsystem (in case of RAM). To provide the replicate performance with the same input data as the initial performance, the results of read requests recorded during the initial performance are replayed when the same requests occur during the replicate performance.

The replicate performance is not synchronised with the initial performance. The same identical selected data processing steps are performed first in the initial performance in the first one of the data processing unit sub-systems 701 (or 702) and the replicate performance in the replay sub-system 702 (or 701) starts later. The initial and replicate performances in redundant operation may overlap in time. A limit on latency may be imposed on the delay for the replicate performance, so that an excessive delay causes the check/replay unit 722 to produce an error signal.

The check/replay unit 722 also may produce an error signal if the content or order of replicate performance of the data processing steps selected for redundant operation during a defined area of addresses whose order is designated as safety critical is different from the initial performance. However, different safety critical areas of this kind may be performed in a different order in the replicate performance from the initial performance. Also, redundant operation of different safety critical areas may be performed with intervals of non-redundant operation.

In an example of such redundant operation with intervals of non-redundant operation, the data processing unit sub-system 701 performs the following sequence of data processing steps:
ABCDQRSTUVWEFGH
where ABCD and EFGH are an initial performance of data processing steps in different areas of a safety critical task and QRSTUVW are data processing steps of a non safety critical task. The input data for the initial performance of data processing steps ABCD and EFGH are registered in the temporary data store 720, with address information enabling the check/replay unit 722 to recover the stored data for the replicate performance of the same data processing steps even if the areas ABCD and EFGH are executed in a different order during the replicate performance.

The data processing unit sub-system 702 starts later to execute the following sequence of data processing steps:
EFGHABCDMNOP
where ABCD and EFGH are a replicate performance of the data processing steps in the same areas of the safety critical task as performed by the sub-system 701 and MNOP are data processing steps of a non safety critical task different from the non safety critical task performed by the sub-system 701. The replicate performance of the two areas EFGH and ABCD is in a different order from the initial performance but within each area, the data processing steps are executed in the same order in the replicate performance as in the initial performance.

If one of the data processing unit sub-systems 701 or 702 gets too far ahead of the other sub-system 702 or 701 in execution of a safety critical area and would execute an operation which would overflow the temporary data store 720, either a non-critical error is signaled or the data processing unit sub-system in question is halted temporarily.

Figure 8:
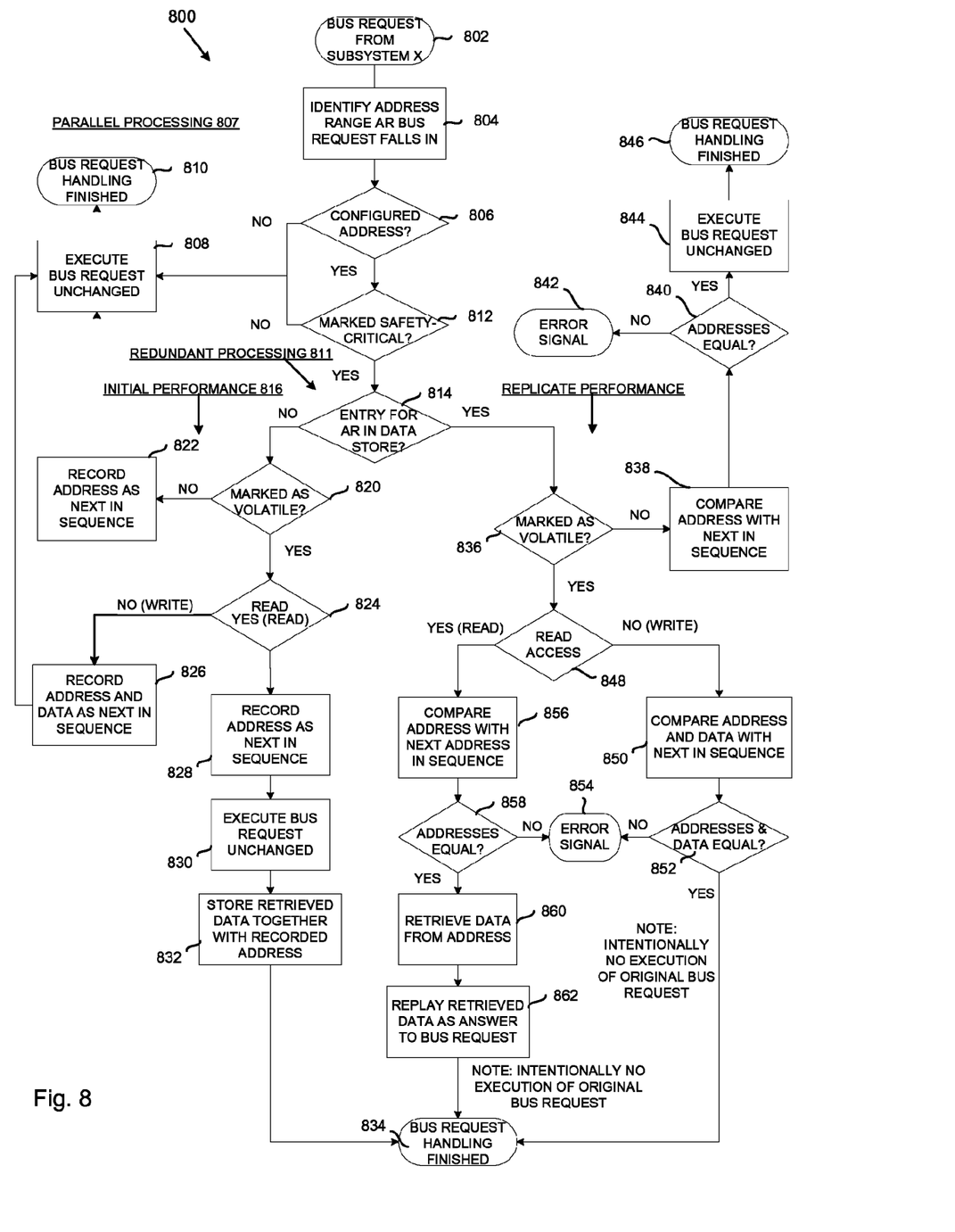
FIG. 8 is a simplified flow chart of an example of a data processing method applicable to the dual-core data processor of FIG. 7, comprising both redundant operation and decoupled parallel operation.

FIG. 8 is a simplified schematic flow chart of a method 800 of processing data applicable to the data processor 700. The process starts at 802 with a bus request from one of the sub-systems 701 or 702, referred to below as sub-system X, the other(s) being referred to below as sub-system Y. At 804, the address range selector 724 attempts to identify into which configured address range AR the address of the bus request falls. At 806, a decision is made whether the address matches a configured address range. If not, the process proceeds in decoupled parallel operation 807 with the sub-system X executing the bus request without any change at 808 and the handling of the bus request terminates at 810.

If the address matches a configured address range, the address range selector 724 identifies whether the address range AR is marked as part of a safety critical area to be processed by redundant operation 811 at a decision 812 and if not, the process proceeds in decoupled parallel operation with the sub-system X executing the bus request without any change at 808.

While the corresponding data processing sub-system X, is executing an instruction in parallel operation 808, the other data processing sub-system Y can be executing different data processing steps or instructions, for parallel operation or for redundant operation of a task.

At decision step 812, if the current instruction is marked as safety-critical, the process proceeds in redundant operation 811. A decision is made at 814 whether one or more data entries for the identified address range AR from the sub-system Y exist in the data store 720. If not, the sub-system X proceeds with an initial performance 816 of the task for the bus request but if one or more data entries from the sub-system Y exist, the sub-system X proceeds with replicate performance 818 of the task for the bus request.

The initial performance 816 in redundant operation starts at step 820 by a decision whether the address range AR is marked as volatile. If the address range is marked as non-volatile, the process continues at 822 by recording the address in the data store 720 as next in the sequence for the address range AR performed by sub-system X and then the sub-system X executes the bus request without any change at 808.

If the address range is marked as volatile, the process continues at 824 by a decision whether the access is a read or a write access. If the access is found at 824 to be a write access, the process continues at 826 by recording the address and the data written in the data store 720 as next in the sequence for the address range AR performed by sub-system X and then the sub-system X executes the bus request without any change at 808.

If the access is found at 824 to be a read access, the process continues at 828 by recording the address in the data store 720 as next in the sequence for the address range AR performed by sub-system X. The sub-system X executes the bus request without any change at 830 and at 832 stores the data retrieved from the bus client together with the address recorded at 828 and the handling of the bus request terminates at 834.

If the decision at 814 is that one or more data entries from the sub-system Y do exist for the identified address range AR in the data store 720, the sub-system X proceeds with a replicate performance 818 of the task for the bus request. The replicate performance 818 in redundant operation starts at step 836 by a decision whether the address range AR is marked as volatile. If the address range is marked as non-volatile, the process continues at 838 by comparing the address with the next address of the sequence of the range AR recorded by sub-system Y in the data store 720. At 840, if the addresses are different, the process produces an error signal at 842. If at 840 the addresses are the same, the process proceeds in redundant operation with the sub-system X executing the bus request without any change at 844 and the handling of the bus request terminates at 846.

If the address range is found at 836 to be marked as volatile, the process continues at 848 by a decision whether the access is a read or a write access. If the access is found at 848 to be a write access, the process continues at 850 by comparing the address and the data produced by sub-system X for writing with the next address of the sequence of the range AR and the data written as recorded by sub-system Y in the data store 720. At 852, if the addresses or the data are different, the process produces an error signal at 854. If at 852 the addresses and the data are the same, the process terminates redundant operation at 834 without the respective bus client receiving nor executing the bus request.

If the access is found at 848 to be a read access, the process continues at 856 by comparing the address with the next address of the sequence of the range AR as recorded by sub-system Y in the data store 720. At 858, if the addresses are different, the process produces an error signal at 854. If at 858, the addresses are found to be the same, the process continues at 860 by the sub-system X retrieving from the corresponding address the data recorded by sub-system Y in the data store 720. At 862, the sub-system X replays the data retrieved at 860, and the process terminates redundant operation at 834 without the bus request being forwarded and executed by the respective bus client.

In another example of an embodiment of the process 800, non-volatile bus requests are encoded with MISR registers instead of storing them in the temporary data store and the MISR codes compared at step 838. In yet another example of an embodiment of the process 800, non-volatile bus requests are not compared and the steps 822, 838, 840 and 842 are omitted, but all writes to I/O registers are treated as volatile and are compared. For simplicity, FIG. 8 does not show time-out error production steps, which handle the special cases "Temporary data store overflow" and "bus request from subsystem X gets no equivalent from subsystem Y within time out period" mentioned above. It should also be noted that the sequential drawing of steps in FIG. 8 does not necessarily mandate a similar implementation. An actual implementation might perform several of those steps in parallel or even in different sequential order. For example, the bus execution and storage steps 808 and 822 or 828 and 830 could be exchanged in sequence. Also the order of the execution and checking steps 844 and 840 can be switched if the system does not require immediate failure notification, for example.

It will be appreciated that the capability to perform a mix of non-redundant and redundant operation without any need to switch operation globally between a lock-step mode and a decoupled parallel mode allows the system performance to be improved by only running safety critical tasks redundantly. It allows a far more granular selection between redundant execution and decoupled execution, than is possible in case of a system employing lock-step execution. More particularly, the parallel operation (405; 807) and the non-synchronised redundant operation (401; 811) have durations corresponding to durations of operating system tasks and/or software threads. Accordingly, the granularity of switching between the parallel operation (405; 807) and the non-synchronised redundant operation (401; 811) can correspond with the durations of operating system tasks and/or software threads. That means that operation can be switched more frequently between redundant execution and decoupled execution for this purpose, the number of data processing steps executed before switching being reduced to the size of a task or a software thread, which is especially beneficial, since it matches the need of software developers. Furthermore, since the redundant execution of tasks is non-synchronous, the probability of common cause failures is significantly reduced or sometimes completely eliminated.

The invention may be implemented at least partially in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals or data from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the desired functionality. For example, in the data processor 200 respective similar R/R units 231 and 232 are provided within the data processing units 201 and 202, enabling each of the data processing units 201 and 202 to act either in record mode 402 or in replay mode 404. However, the recording of result data and calculation of a hash code may alternatively be performed in one only of the data processing units 201 and 202 without the capability of comparison and sent to the other of the data processing units 201 and 202 which performs the comparison, for example in the case of a master/slave configuration of the data processor.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the data processing units 201 and 202 may be implemented as circuitry located on a single integrated circuit. Alternatively, the examples may be implemented as any number of separate integrated circuits or separate devices interconnected with each other in a suitable manner. For example, the data processing units 201 and 202 may be implemented as circuitry located on separate integrated circuits or separate interconnected devices.

Also for example, the examples, or portions thereof, may be implemented as software or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of processing data in a data processor comprising a first data processing unit and a second data processing unit, the method comprising:
performing first data processing steps in said first data processing unit concurrently with second data processing steps in said second data processing unit during a parallel operation;
and
replicating performances of third data processing steps in said first and second data processing units during a non-synchronised redundant operation, said non-synchronised redundant operation comprising
performing an initial performance of said third data processing steps at said first data processing unit,
recording first volatile data used by said first processing unit during said initial performance as recorded volatile data,
performing a replicate performance of said third data processing steps starting later than said initial performance at said second data processing unit,
using said recorded volatile data during said replicate performance,
registering initial result data representative of results from said initial performance,
comparing replicate result data representative of results from said replicate performance with said initial result data, and
producing an error signal in case of discrepancy between said replicate result data and said initial result data.

2. The method of processing data as claimed in claim 1, wherein said initial performance is performed in said first data processing unit and said replicate performance is performed in said second data processing unit.

3. The method of processing data as claimed in claim 1, wherein said parallel operation or said non-synchronised redundant operation is selected as a function of at least one of a position in a sequence of data processing steps that includes said first, second, and third data processing steps and of a memory address in said sequence of data processing steps.

4. The method of processing data as claimed in claim 1, wherein said parallel operation and said non-synchronised redundant operation have first durations corresponding to durations of software threads, said durations to enable a granularity of switching between said parallel operation and said non-synchronised redundant operation to correspond with said software threads.

5. The method of processing data as claimed in claim 1, wherein said non-synchronised redundant operation starts and terminates in response to a start instruction key and a termination instruction key, respectively.

6. The method of processing data as claimed in claim 1, wherein said non-synchronised redundant operation starts and terminates in response to a specific start operation address and a specific termination operation address, respectively.

7. The method of processing data as claimed in claim 1, wherein said recorded volatile data used in said replicate performance is verified against second volatile data, and modifications of said recorded volatile data in said replicate performance are prevented.

8. The method of processing data as claimed in claim 1, wherein said initial performance is not gated by said replicate performance and said replicate performance is not gated by said initial performance.

9. The method of processing data as claimed in claim 1, wherein said initial performance and said replicate performance are non-overlapping performances of said third data processing steps.

10. A data processor comprising
a first data processing unit and a second data processing unit, said first and second data processing units being arranged to
perform different non-synchronised data processing steps during a parallel operation, and to replicate performance of identical data processing steps during a non-synchronised redundant operation,
said data processor further comprising a comparison module operational during said non-synchronised redundant operation to
record first volatile data, used by said first processing unit during an initial performance of said identical data processing steps at said first data processing unit, as recorded volatile data,
register initial result data representative of results from said initial performance,
use said recorded volatile data during a replicate performance of said identical processing steps, wherein said replicate performance starts later than said initial performance,
produce replicate result data representative of results from said replicate performance,
compare said replicate result data with said initial result data, and
produce an error signal in case of discrepancy between said replicate result data and said initial result data.

11. A The data processor as claimed in claim 10, wherein said first data processing unit executes said initial performance and said second processing unit executes said replicate performance.

12. The data processor as claimed in claim 10, wherein said first and second data processing units operate with different clock speeds during said non-synchronised redundant operation.

13. The data processor as claimed in claim 10, wherein said comparison module is arranged to be non-operational during said parallel operation.

14. The data processor as claimed in claim 10, wherein said comparison module includes a data store for storing said first volatile data as said recorded volatile data.

15. The data processor as claimed in claim 14, wherein said replicate performance is arranged to replace second volatile data for use in said replicate performance with said recorded volatile data, to verify said recorded volatile data against said second volatile data, and to prevent modifications of said recorded volatile data in said replicate performance.

16. The data processor as claimed in claim 10, wherein said comparison module is arranged to register and compare hash codes condensing non-volatile data used in said initial performance and said replicate performance.

17. The data processor as claimed in claim 10, wherein said comparison module includes a record/retrieve unit operational to register an initial hash code of data included in said initial result data, and to compare a replicate hash code of data included in said replicate result data, said comparison module being arranged to compare said replicate hash code with said initial hash code, and to produce said error signal in case of discrepancy between said replicate hash code and said initial hash code.

18. The data processor as claimed in claim 17, wherein said comparison module includes a plurality of comparison elements, a first comparison element of said plurality of comparison elements being operable to receive said initial hash code or said replicate hash code from a second comparison element of said plurality of comparison elements, to compare said replicate hash code with said initial hash code, and to produce said error signal in case of discrepancy between said replicate hash code and said initial hash code.

19. The data processor as claimed in claim 18, wherein said first comparison element is operable to compute and register said initial hash code, the first comparison element being arranged to be activated subsequently to compute said replicate hash code.

20. A method of processing data in a data processor comprising a first data processing unit and a second data processing unit, the method comprising:
performing first data processing steps in said first data processing unit concurrently with second data processing steps in said second data processing unit during a parallel operation; and
replicating performances of third data processing steps in said first and second data processing units during a non-synchronised redundant operation, said non-synchronised redundant operation comprising
performing an initial performance of said third data processing steps in said first data processing unit,
performing a replicate performance of said third data processing steps in said second data processing unit, starting later than said initial performance wherein said initial performance is not gated by said replicate performance and said replicate performance is not gated by said initial performance,
registering initial result data representative of results from said initial performance,
comparing replicate result data representative of results from said replicate performance with said initial result data, and
producing an error signal in case of discrepancy between said replicate result data and said initial result data.

* * * * *